M. P. NEFF.
HARROW.
APPLICATION FILED FEB. 14, 1910.

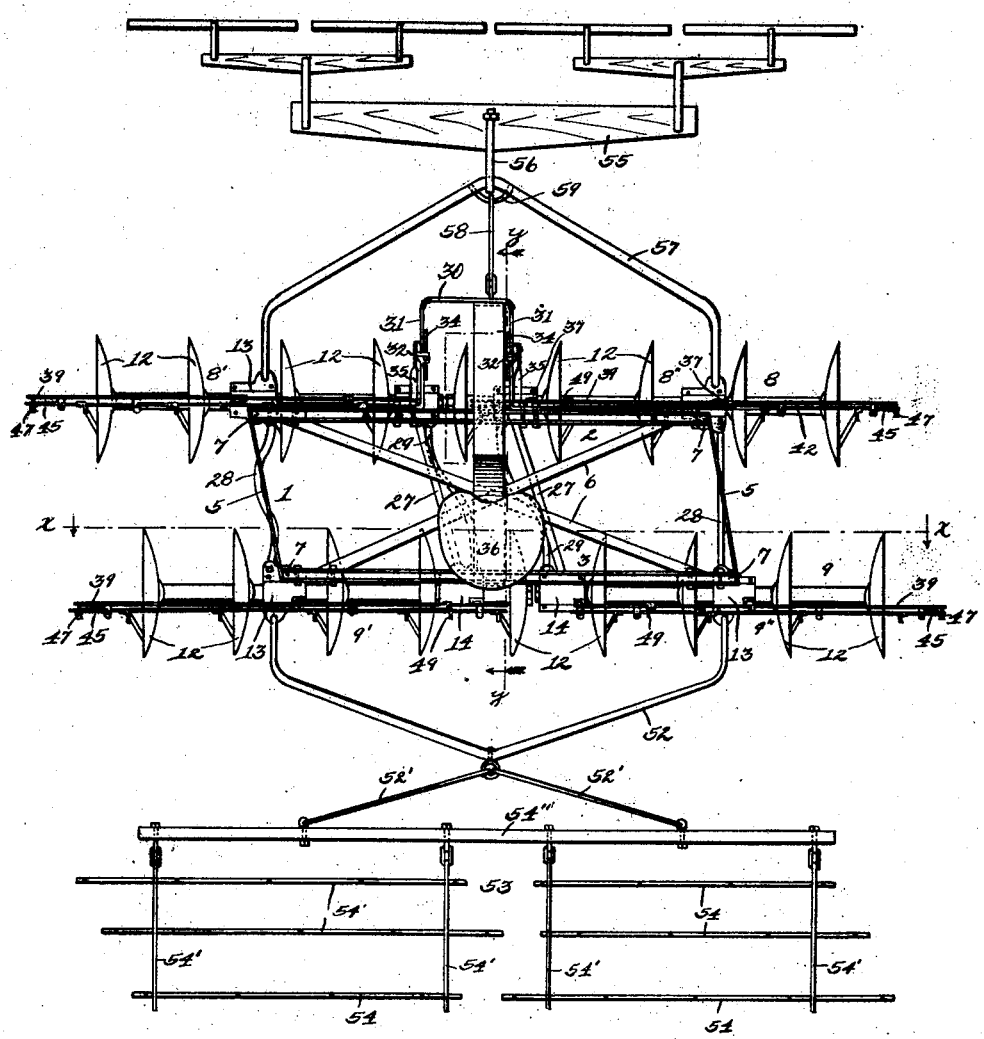

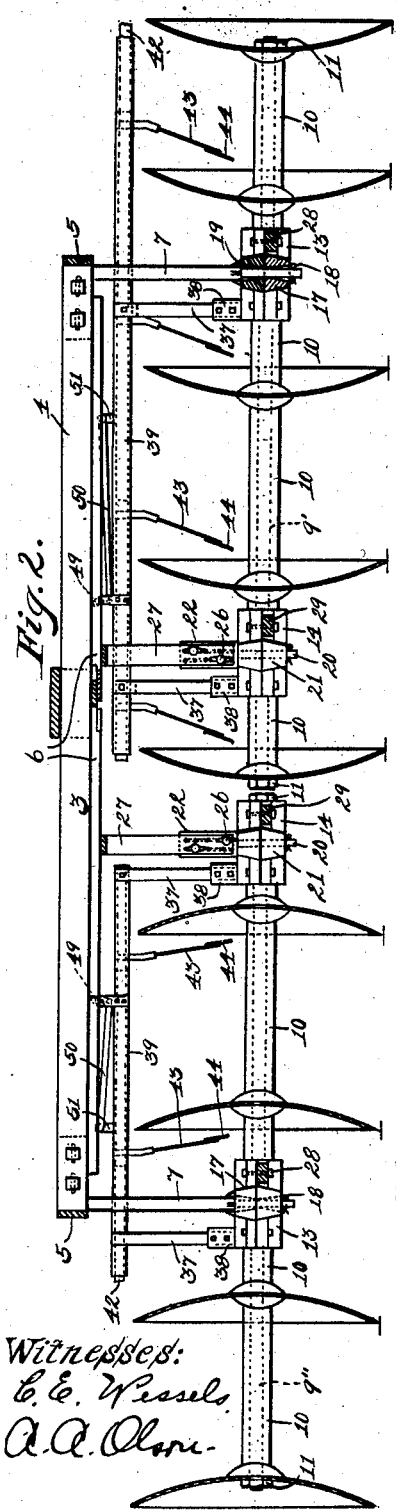

973,805.

Patented Oct. 25, 1910.
3 SHEETS—SHEET 3.

Witnesses:
C. E. Wessels.
A. A. Olson.

Inventor:
Miles P. Neff,
By Joshua R. H. Potts
his Attorney.

UNITED STATES PATENT OFFICE.

MILES P. NEFF, OF WAYLAND, IOWA.

HARROW.

973,805.  Specification of Letters Patent.  Patented Oct. 25, 1910.

Application filed February 14, 1910. Serial No. 543,887.

*To all whom it may concern:*

Be it known that I, MILES P. NEFF, a citizen of the United States, residing at Wayland, county of Henry, and State of Iowa, have invented certain new and useful Improvements in Harrows, of which the following is a specification.

My invention relates to a disk harrow and has for its object the production of a device of this character which will be strong, durable, and economical in construction, which will be susceptible of ready adjustment to different positions so as to render the same more effectual, and which will be efficient in operation.

Other objects will appear hereinafter.

With these objects in view my invention consists in a harrow characterized as above mentioned and in certain details of construction and arrangement of parts all as will be hereinafter fully described and particularly pointed out in the appended claims.

Figure 6:
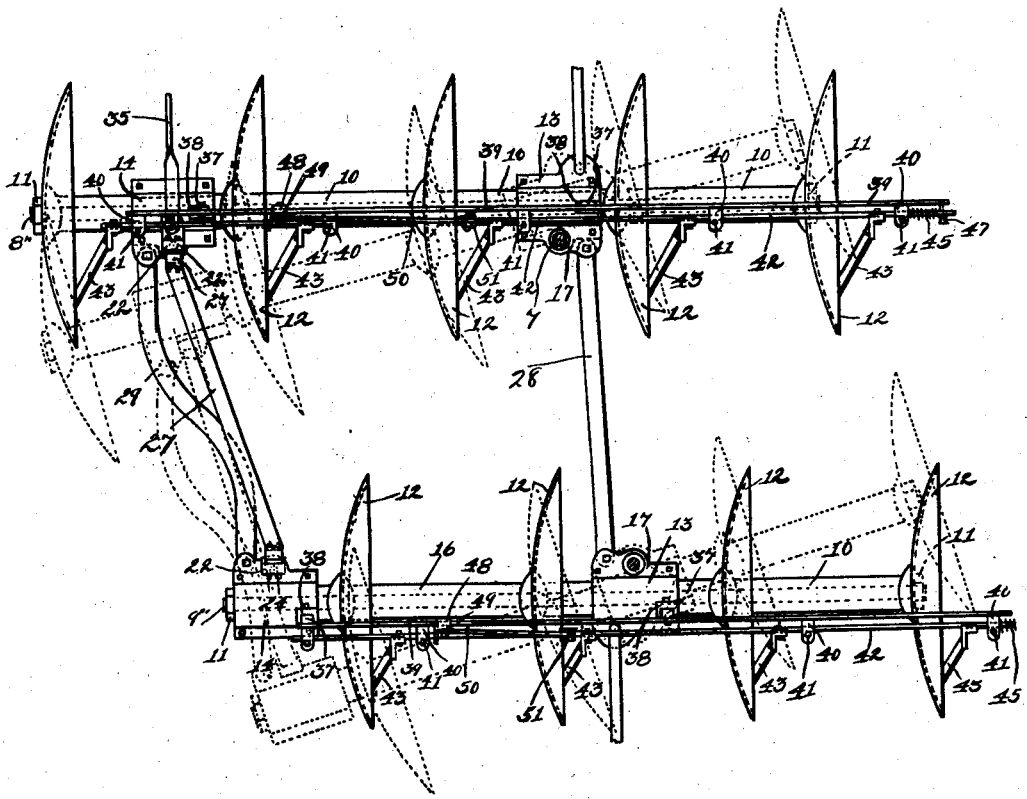
Figure 7:
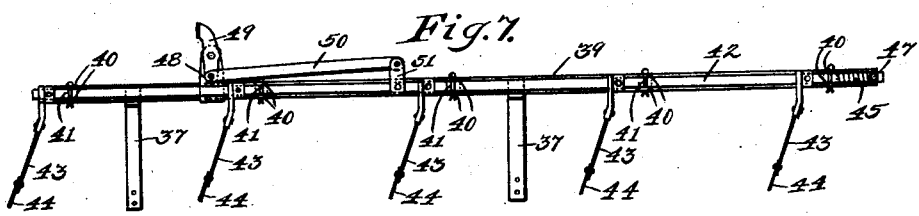

My invention will be more readily understood by reference to the accompanying drawings forming a part of this specification, and in which, Figure 1 is a top plan view of a disk harrow embodying the preferred form of my invention, Fig. 2 is an enlarged vertical transverse section taken on substantially the line $x$—$x$ of Fig. 1, Fig. 3 is an enlarged vertical longitudinal section taken on substantially the line $y$—$y$ of Fig. 1, Fig. 4 is a sectional detail of one of the journal boxes included in the device, Fig. 5 is a detail perspective of a portion of the structure, Fig. 6 is a slightly enlarged top plan view of the diskgangs at one side of the machine, and Fig. 7 is a side elevation of one of the disk scraping devices included in the machine, detached.

Referring now to the drawings, 1 indicates the body or frame of the device comprising parallelly disposed front and rear bars 2 and 3 respectively, each of which is composed preferably of two parallelly extending members 4, parallelly extending side bars 5 disposed preferably at slight angles to the bars 2 and 3, and diagonally extending bars 6; said bars 2, 3, 5 and 6 being bolted or riveted together to form a rigid substantially rectangular frame work. Rigidly secured to and depending from each of the corners of the frame 1 is a post 7 the upper extremity of which preferably rests between adjacent members 4.

Arranged below the frame 1 at the front and rear ends thereof are transversely disposed shafts 8 and 9 respectively, the shaft 8 being formed of normally co-axially disposed independent shaft parts 8′ and 8″, and the shaft 9 being comprised of similarly arranged shaft parts 9′ and 9″. Carried upon each of said shaft parts, the same being spaced apart thereon by sleeves 10 and securely clamped thereon between the latter by nuts 11 threaded upon the respective extremities of the former, is a gang or plurality of disks 12; each of the shaft parts 8″ and 9′ carrying preferably five disks whereas each of the shafts 8′ and 9″ carry four. The disks upon the shaft 8 are, for reasons which will be hereinafter set forth, positioned to act between or in non-alinement with those carried by the shaft 9. Certain of the sleeves 10 of each of said shaft parts are journaled in two-parts bearing boxes 13 and 14. The journals of said sleeves are preferably slightly reduced and the same are provided with circumferential ribs or beads 15 which engage correspondingly positioned internal grooves 16 in said boxes, as clearly shown in Fig. 4, whereby the same are evidently held against longitudinal movement in said boxes. The bearing boxes 13 are positioned below and in vertical alinement with the posts 7, the same being provided with perforated lugs or bearing-forming portions 17 which are engaged by the lower reduced ends of said posts. Cotter pins 18 serve to lock said posts in engagement with said lugs. The opening 19 through each of said lugs or bearings 17, as clearly shown in Fig. 2, is of smallest diameter at its center the same diverging outward at either end. With such design it will be seen that free movement or rocking of the disk-carrying shafts in a vertical plane and also in a horizontal plane is permitted.

Having their lower ends 20 mounted in lugs 21 formed upon the bearing boxes 14, are upwardly projecting toothed blocks 22 provided with elongate vertically extending slots 23. Having their respective lower toothed ends engaging corresponding blocks 22 upon said shafts 8 and 9, the same being adjustably secured thereto by bolts 24 which pass through perforations 25 therein and the slots 23 in said blocks, and thumb nuts 26 threaded upon said bolts, are inverted U-shaped members 27. With this connection of the ends of the members 27 it will be seen that vertical adjustment of the latter to a considerable extent is permitted. The upper or horizontally extending portions of said members loosely rest against the under frame bars 6, as clearly shown in the several views, whereby said members are evidently adapted to serve as a means of maintaining the inner ends of the disk shafts against vertical movement above any predetermined point, thus making it possible, with this provision, to adjust the device so that the innermost disks will cut deeper than the outermost if desired. By the provision of the interlocking teeth upon the contacting surfaces of said members and the blocks 22 a positive, non-slidable connection between said parts is effected.

Extending between and having their respective ends pivotally connected to corresponding bearing blocks 13 and 14 upon the shafts 8 and 9 are bars 28 and 29 respectively. By the provision of the bars 29 operative connection between alining shaft parts 8′, 8″, 9′ and 9″ is effected and whereby the horizontal movement or adjustment of one each pair causes the simultaneous operation of the other, as clearly illustrated in Fig. 6.

Centrally secured to and forwardly projecting from the bar 2 is a loop 30 having parallel side portions 31. Fulcrumed to each of said side portions 31 is a lever 32 carrying an ordinary spring pressed pawl 33 which is adapted to coöperate with a rigid co-axially arranged segment rack 34 to lock said lever in any position to which it may be adjusted. The lower ends of the levers 32 are operatively connected by means of links 35 to ears 22′ formed upon the blocks 22, hence indirectly to the boxes 14, whereby the horizontal angular disposition of the respective pairs of shaft parts is governable by said levers. An operator's seat 36 mounted upon the frame 1 is so located that the levers 22 are in operative proximity therewith.

Carried by each of the shaft parts 8′, 8″, 9′ and 9″, depending arms 37 thereof being rigidly secured to upwardly projecting lugs 38 formed integrally with the bearing boxes 13 and 14 of the former, is a horizontally disposed bar 39 extending in close proximity with the upper peripheries of the disks carried by the shaft upon which it is mounted. Slidably mounted upon each of the bars 39 between parallelly disposed ears 40 formed thereon, the same being held in position between said ears by cotter pins 41, is a rod 42. Having their upper ends rigidly secured to said rod are obliquely depending arms 43 carrying scraper blades 44 at their lower ends, the latter being so positioned as to be adapted to rest against the concave sides of the disk 12 adjacent the peripheries thereof, as clearly shown in Fig. 3, when the rod 42 is properly shifted or operated. A coil spring 45 interposed between one of the pairs of ears 40 and a lug 47 provided upon each of the rods 42 is adapted to normally hold said scraper blades in inoperative position, that is out of contact with said disks. Rigidly secured to each of the bars 39 is an upwardly projecting ear 48 to which is pivoted a foot lever 49. The lower end of each of the levers 49 is connected by means of the link 50 to a lug 51 upwardly projecting from the rod 42 mounted adjacent thereto. By this provision it will be seen that an efficient foot-operable means is provided for effecting the operative positioning of the scraper blades.

Having its forward extremities loosely connected to the rear bearing boxes 13 is a strap or connecting bar 52 to which is connected, by means of bars 52′, a toothed harrow 53, the latter being of ordinary design, comprising toothed bars 54 connected by connecting bars 54′ to a main bar 54″. A double whiffletree 55 is preferably employed, it being connected through its clevis 56 centrally to a draft member 57 the extremities of which loosely engage perforated lugs formed upon the forward bearing boxes 13. A link 58 extends from the forward end of the loop 30 to an eye 59 provided at the forward end of the member 57.

With the provision of a device of a construction as set forth, when drawn over the ground with the gangs in operative position, the ground will be evenly and uniformly harrowed and will be devoid of ridges and furrows such as are formed therein when broken by disk harrows of the ordinary design. This even breaking of the ground, without the formation of furrows or ridges therein is due mainly to the non-alining arrangement of the disks of the front and rear gangs. With the construction as set forth the gangs of disks upon the opposite sides of the machine will be susceptible to independent adjustment to any horizontal angular disposition or any vertical angular disposition desired. Further, with this construction it will be observed that the draft force is applied to the bearing boxes carrying the gangs of disks and not to the supporting frame, thus the drawing force is applied directly to the operating parts of the device relieving the frame from any undue wear or strain such as it is subjected to in similar machines now generally in use where the force is applied to the frame and communicated therethrough to the operating parts.

While I have shown what I deem to be the preferable form of my device I do not wish to be limited thereto as there might be various changes made in the details of construction and arrangement of parts described without departing from the spirit of the invention comprehended within the scope of the appended claims.

Having described my invention what I claim as new and desire to secure by Letters Patent is:

1. In a harrow, the combination of a frame, two gangs of disks arranged under each side of said frame one in front of the other, each of said gangs of disks being mounted to rock in vertical planes, substantially U-shaped members adjustably secured to the inner ends of each of said gangs on the same side and arranged to loosely contact with the bottom of said frame, and means of draft for said harrow, substantially as described.

2. In a harrow, the combination of a substantially rectangular frame, two gangs of disks arranged under each side of said frame one in front of the other, the disks of the respective gangs at the same side being in nonalinement, and the number of disks in the forward gang on one side being greater than the number in the corresponding rearward gang and the number of disks in the forward gang on the other side being less than the number in the corresponding rearward gang, said gangs being pivotally mounted upon depending posts at each corner of said frames, said connection being such as to permit of the rocking of said gangs in vertical and horizontal planes, means for simultaneously swinging the gangs of each pair on their pivotal points in a horizontal plane in the same direction independently of the other pair of gangs and for holding them in their positions of adjustment, substantially U-shaped members adjustably secured to the inner ends of each of said gangs on the same side and arranged to loosely contact with the bottom of said frame, and draft elements connected directly with said gangs at their points of pivotal connection with said frame, substantially as described.

In testimony whereof I have signed my name to this specification in the presence of two subscribing witnesses.

MILES P. NEFF.

Witnesses:
   E. J. EICHER,
   C. C. MENYER.